May 26, 1942.  C. S. ASH  2,284,357
DUAL WHEELED VEHICLE
Filed Jan. 19, 1940   7 Sheets-Sheet 2

INVENTOR
Charles S. Ash
By Morgan, Finnegan & Durham
ATTORNEYS

May 26, 1942.    C. S. ASH    2,284,357
DUAL WHEELED VEHICLE
Filed Jan. 19, 1940    7 Sheets-Sheet 4

May 26, 1942.   C. S. ASH   2,284,357
DUAL WHEELED VEHICLE
Filed Jan. 19, 1940   7 Sheets-Sheet 6

Fig 16

INVENTOR
Charles S. Ash
BY
Morgan, Finnegan & Durham
ATTORNEYS

May 26, 1942.　　　　C. S. ASH　　　　2,284,357
DUAL WHEELED VEHICLE
Filed Jan. 19, 1940　　　　7 Sheets-Sheet 7

Patented May 26, 1942

2,284,357

UNITED STATES PATENT OFFICE 2,284,357

DUAL WHEELED VEHICLE

Charles S. Ash, Milford, Mich.

Application January 19, 1940, Serial No. 314,629

17 Claims. (Cl. 188—18)

The present invention relates to new and useful improvements in connection with the braking of dual wheeled-vehicles and more particularly to new and useful improvements in connection with the braking means for braking independently rotatable dual wheels.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings referred to herein and constituting a part hereof, illustrate one embodiment of the invention, and together with the description, serve to explain the principles of the invention.

The present invention has for its object the provision of a novel and improved braking means for braking the independently rotatable wheels of a duel wheel automotive or trailer vehicle. A further object of the invention is the provision of an improved brake for independently rotatable dual wheels which is compact, positive, is not subject to excessive heating and is easily accessible for servicing and adjustment. Still another object of the invention is the provision of an improved independently rotatable dual wheel brake in which the brakes for the separate wheels are concentric and yet do not exert any axial thrust on the wheel bearings. The invention also provides an improved independently rotatable dual wheel brake which can be made exceedingly strong and light in weight and in which the braking members oppose each other and require no strong bracing support for their mounting.

In accordance with the present invention each of the independently rotatable, coaxial wheels is provided with a cylindrical brake drum rigidly connected to its respective wheel for coaxial rotation and in substantially the same general plane.

One or more pairs of brake shoes are provided, which may be relatively movable towards and from each other and are movable into and out of contact with their respective brake shoes. Preferably, the pair of brake shoes are movable as a unit to equalize their pressure against the brake drums and so that substantially the only forces transmitted from the drums to the brake supports through the brake shoes are rotational forces, thereby reducing the tendency to deform the brake drums and lightening the parts required for support. Where a plurality of pairs of brake shoes are used, they may be mounted diametrically opposite each other. The brake mechanism may be of the servo- or self-energizing type and the brake shoes may be positioned in the space between the brake drums, or the brake drums may rotate with their peripheries between the brake shoes.

Referring now in detail to the illustrative embodiment of the invention as shown in Figs. 1 to 5 of the drawings, the invention is shown as applied to a pair of independently rotatable dual wheels which are mounted for coaxial, independent rotation upon a dead or trailing axle with the braking means for both wheels at the inner side of the inner wheel. As embodied, the dual wheels comprise an outer wheel and rim 20 adapted to be fitted with a pneumatic tire and demountably bolted to the outer wheel hub 21 by means of the bolts 22, the interior of the hub being fitted with spaced apart tapered roller bearings 24 and 25 which are seated on the bearing receiving portions 26 and 27 of the trailing axle end 28 and are retained thereon by means of the axle end nut 29 which tightens the bearings against their seats in the wheel hub 21 and holds the wheels against axial movement on the axle.

The inner wheel and rim 30 is preferably a duplicate of the outer wheel and rim 20 and is bolted to the inner wheel hub 31 by the mounting bolts 32. The interior of the inner hub 31 is formed as a cylindrical bearing surface 33 and is journalled on the cylindrical and telescoping inwardly extending portion 34 of the outer wheel hub 21 by means of the thin graphite bronze bearings 35. The axial thrust between the inner and outer wheels is taken by the thrust washers 36 which are positioned at the ends of the inner wheel hub 33 and surround the outer wheel hub 21. Thus the inner and outer wheels are held in coaxial relation but are permitted to have free relative rotation.

The braking means for the inner and outer wheels includes separate and adjacent brake drums attached to the inner and outer wheels and adapted to rotate with them. The inner wheel brake drum comprises a cylindrical member 40 of considerable width which is provided with a relatively smooth exterior braking surface and a helically ribbed inner surface 41, this brake drum 40 having cast integral with it a dished supporting member 43 by which it is attached to the inner face of the inner wheel. The dished supporting member 43 at its outer end is provided with a radially extending portion 44 by which the dished portion and the brake drum 40 are securely fastened to the inner face of the inner wheel, by bolting or otherwise.

The brake drum for the outer wheel is preferably located within the inner wheel brake drum 40 and comprises a brake drum member 50 which is provided with a smooth inner braking surface and an outer helically ribbed surface 51, the brake drum being preferably formed integrally with the radially inwardly extending portion 53 which is annularly grooved on its outer end to receive and be bolted securely to the inner end of the outer wheel hub 21 by means of the screws 55.

The inner brake drum 50 for the outer wheel 20 and the outer brake drum 40 for the inner wheel 30 are preferably provided with braking surfaces of substantially the same width, the brake drums are coaxial and securely fastened to their respective wheels and only a small clearance is left between their adjacent helically ribbed surfaces 41 and 51.

Means are provided for exerting friction on the brake drums 40 and 50 and comprise a pair of axial brake shoes 60 and 70 which are adapted to be moved relatively towards and from each other into and out of contact with their respective brake drums and to press against their brake drums with powerful pressure which can be regulated by the driver to obtain the desired degree of braking.

As embodied, the brake shoe 60 for the inner wheel is positioned radially outwardly of the outer brake drum 40, while the brake shoe 70 for the outer wheel is positioned within the inner brake drum 50. Each of the brake shoes 60 and 70 comprises an arcuate member provided with a facing of friction material such as brake lining 61, 71 of substantially equal circumferential length on its side adjacent its respective brake drum, and on its opposite side provided with a circumferentially extending strengthening rib 62, 72. In order to insure equal braking effort on both wheels, the area of the brake linings 61 and 71 are preferably equal and of similar material, and these brake linings are accurately shaped to correspond to the curvature of their respective brake drums.

Supporting and actuating means for the brake shoes comprise the bell crank 76 and the link 77 which are provided with outwardly extending studs 78 which pass through suitable positioned apertures in the brake shoes 60 and 70, these apertures being spaced so that the bell crank 76 and link 77 normally lie radially of the wheel axis and when in this radial position hold the brake shoes 60 and 70 concentric and slightly out of contact with their respective brake drums. By angularly moving the bell crank 76, the radial distance between the two brake shoes is reduced, thereby bringing the brake shoes into contact with their respective brake shoes with equal pressure, and the link 77 serves to maintain the concentric position of the brake shoes in all of their relative positions.

Means are also provided for holding the brake shoes 60 and 70 against rotational movement so that the friction between the brake shoes and the brake drums 40 and 50 retards the rotation of the wheels, and for this purpose, the outer brake shoe 60 is provided with a downward extension 64 having an aperture at its end which is fitted over a stud 66 projecting towards the inner wheel and securely supported in the brake anchor 80. A slip 81 attached to the end of the brake shoe engages a groove 81' in the outer end of the stud 66 and serves to hold the brake shoe 60 against axial movement, while washers 78 and cotter pins through holes 79 serve to hold the bell crank 76 and link 77 against axial movement with respect to either brake shoe.

Brake anchor 80 comprises a downwardly extending member formed integrally with a flange 82 having a cylindrical hub 83 which is fitted over and keyed to a portion of the axle 28 so that the flange and anchor are held against rotational movement, and the outer end of the hub 83 may also serve as the shoulder for the inner race of bearing 25. The hub 83 is formed with a grooved annular portion 84 in which is fitted a felt lubricant retaining ring 85 which contacts with the inner circular surface of the brake drum supporting web 53. The outer rim of flange 82 is a cylindrical portion 86 which extends outwardly towards the inner wheel and is grooved to receive a larger felt lubricant retaining ring 88 bearing against the outer surface of a cylindrical lip 89 formed on the inboard side of the brake drum supporting web 53, so that lubricant does not leak excessively from the bearings 24 and 25 and dirt is excluded from the bearings. A drain hole 87 is provided at the junction of anchor 80 and the flange 82 so that any lubricant which may leak past the rings 85 and 88 is discharged away from the braking surfaces. A dust cover, shown in detail in Figure 5, further serves to exclude dust and dirt from the brake and wheel parts. This dust cover comprises a centrally dished circular piece 90 having a wide radial slot 91 which closely fits the sides of the brake anchor 80, while the piece is secured to the flange 82 by means of screws in the holes 92.

Means are provided for normally restoring the brakes to their released position and for holding the brake shoes 60, 70 normally out of contact with both of the brake drums 40, 50. As embodied, a tension spring 94 is connected between the link 77 and the bell crank 76, across the brake drums so as to tend to support the brake shoe 60. Means are also provided for holding the brake shoes normally out of contact with both brake drums and in a fixed position when they are disengaged, and for this purpose a lug 96 supports a set screw 97 which has its end in engagement with an abutment surface on the inner surface of the inner brake shoes 70 and can be adjusted so that when the brake shoe 70 is pulled into contact with the end of screw 97 by the tension of spring 98 connected between the end of shoe 70 and the flange 82, the brake shoe 70 and brake shoe 60 are held spaced from their respective brake drums 50 and 40. A set screw 99 supported on lug 99' also serves to limit movement of the brake shoes 60 and 70.

Any suitable operating mechanism, such as a cable or fluid pressure operated piston rod may be connected with the bell crank at its upper end so as to actuate and release the brakes at the will of the driver.

In the operation of the embodiment shown in Figures 1 to 5, the wheels are normally freely and independently rotatable about their common axis and while they rotate at substantially the same speed, there are differences in their rotation depending upon the course of the vehicle, the conditions of the tires and the road.

The brake drums 40 and 50, fast to their respective wheels, rotate therewith about a common axis, and are normally free of the friction material 61, 71 carried by the brake shoes. When the operator wishes to apply the brakes to retard or stop the vehicle, the bell crank 76 is moved in a counter-clockwise direction, the wheels moving in a clockwise direction. Shoes 60 and 70 move towards each other and into contact with the brake drums 40 and 50 so as to exert friction on the drums. The engagement of the shoe 70 with drum 50 tends to move the shoes harder against drums 40 and 50 thereby giving a servo- or self-energizing action to the brakes.

As the brake drums 40 and 50 rotate with their respective wheels a current of air is drawn between the brake drums 60 and 70 by means of the centrifugal fan action of the helical ribs 41 and 51, these ribs also serving to increase the cooling effect by reason of their relatively great area. The forward travel of the vehicle forces air through the louvre 101 formed at the rear of the brake cover plate 90 and into the interior of the inner brake drum 50 and it can flow from there to the space between the brake drums through the apertures 102 in the brake drum supporting web 53. The supporting web 43 for the outer brake drum is also provided with apertures 103 which also tend to increase the circulation of air over the brake drums 40 and 50, while the relatively thin web section of web 43, the spacing between the brake drum 40 and the inner wheel tire, and the relatively great length of metal between both brake drums and either wheel, reduce to a minimum the amount of heat which can be transmitted from the brake drums to either wheel.

Figures 6 to 13 of the drawings illustrate a modified embodiment of the present invention in which the braking force is applied to the brake drums at a plurality of points, preferably diametrically opposite each other and also preferably on the adjacent faces of the brake drum, that is, on the external periphery of the inner drum for the outer wheel and the internal periphery of the outer brake drum to the inner wheel. In this modification the wheel structure may be a substantial duplicate of that shown in the preceding figures, and the outer brake drum 110 is rigidly connected to the inner wheel by means of the dished member 111, in the same manner as in Figure 3. However, the internal face of the cylindrical brake drum 110 is smooth and the external face is provided with helical air impelling and cooling ribs 112. The inner brake drum 115 is provided with a smooth exterior cylindrical surface, and on its inner surface is provided with helical ribs 116, and this brake drum 115 is connected to the outer wheel hub 21, 34, as in Figure 3, so that the brake drums 110 and 115 are coaxial with each other and with the inner and outer wheels, and are in substantially the same vertical plane.

As in Figures 1 to 5, the brake drums are immovably fastened with respect to their respective wheels, the outer brake drum 110 serving the inner wheel 30 while the inner brake drum 115 is connected to the outer wheel 20.

A brake anchor plate 120 is mounted on the axle 28 on the inboard side of the inner wheel, and this brake anchor comprises a pair of diametrically and oppositely extending members 121 and 122 which are interconnected and mounted on the axle by means of the main casting 123. Near their outer ends each of the members 121 and 122 is provided with an aperture parallel to the axle 28 and extending into the space between the brake drums 110 and 115 and preferably centrally thereof. In each of these apertures is mounted a crank pin 125 having a bearing portion supported in journal 126 which is mounted in a square block 127 slidable radially of the axle 28 in a rectangular opening 129 and held in position by means of set screw 164 and compression spring 165. A cap screw 166 having a reduced end 167 projecting into the bore 168 in block 127 serves to retain spring 165 and at the same time forms a guide for the sliding block 127, as well as permitting the adjustment of this block by set screw 164 so that the crank pin 125 may be accurately positioned centrally of the space between the brake drums 110 and 115.

Brake shoe means are provided cooperating with the brake drums 110 and 115, and as embodied two brake shoes are provided to contact with the outer brake drum 110 and two other brake shoes are provided to contact with the inner brake drum 115. The outer brake shoes comprise an arcuate reinforced shoe 130 having an inwardly projecting rib 131 which is provided with a bearing aperture 132 to fit over the eccentric end portion 133 of crank pin 125, while the inner brake shoe 135 is similarly provided with an externally extending reinforcing rib 136. Midway of its ends, rib 136 is formed with a bearing which cooperates with bearing cap 137 so that the brake shoe 135 may be operatively supported on the eccentric crank portion 138 of crank pin 125. The bearing aperture 132 and bearing 137 are so positioned with respect to their respective brake shoes 130 and 135 and to the crank portions 133 and 138 that the brake shoes 130 and 135 can be retracted out of contact with the brake drums 110 and 115, or by rotation of the crank pin 125 they can be expanded into powerful frictional contact with the brake drums 110 and 115.

A second pair of brake shoes 130 and 135 are preferably supported diametrically opposite the first pair, and are adapted to be simultaneously retracted and expanded so that the pressure on the brake drum 115 is exerted equally at diametrically opposite forces, and the pressure on the brake drum 110 is similarly diametrically equally distributed except in the opposite direction, thereby avoiding the placing of any substantial or excess load on the wheel bearings, and at the same time minimizing the tendency to deform the brake drums. By expanding the brake shoes 130 and 135 away from each other and into contact with their respective brake drums, while these shoes are supported on the movable blocks 127, the only substantial force applied through the members 121 and 122 is the rotational force due to the frictional contact of the brake shoes with their drums, and there is no substantial force exerted diametrically of the axle 28.

Means are provided for simultaneously actuating the brake shoes, and for this purpose each crank pin 125 is provided with an operating lever 140 secured to the inner ends of the crank pins 125, and these levers are substantially parallel to each other when their corresponding crank pins are in the same angular relation. Means are provided for simultaneously and equally moving the levers 140 and for this purpose they are interconnected at their upper ends by means of an adjustable turn buckle link 141, the forward end of which is connected to a link 142 projecting rearwardly from and actuated by the conventional brake pedal or power brake operating means.

In order to hold the brakes out of normal contact with their brake drums when they are in a released position, a set screw 150 is threaded into a tapped hole 151 near the upper end of each brake shoe 130, and a threaded stud 153 is threaded into a similar aperture near the lower end of the brake shoe 130, screw 150 and stud 153 project radially inwardly towards the adjacent brake shoe 135, and the head of screw 150 rests against the corresponding pad 155 on the inner shoe 135, while the end of stud 153 is held out of contact with the corresponding pad 155 by means of a compression spring 157 around the end of stud 153. Projecting upwardly and downwardly from the end of members 121 and 122 are lugs 160 carrying set screws 161 which project outwardly and into contact with the pads 163 on the inner face of the brake shoes 130, and these set screws 161 are preferably so adjusted that brake shoes 130 are held in a definite position when retracted, thereby holding the brake shoes 135 against vibrational movement through the cooperation of set screws 151 and studs 153.

Brake shoes 130 and 135 are preferably faced with brake lining or other suitable friction material, are concentric with their respective brake drums, and preferably have substantially the same area of contact with the brake drums, thereby equalizing the wear on the brake shoes, as well as the braking effort exerted on the respective wheels.

Figure 1:
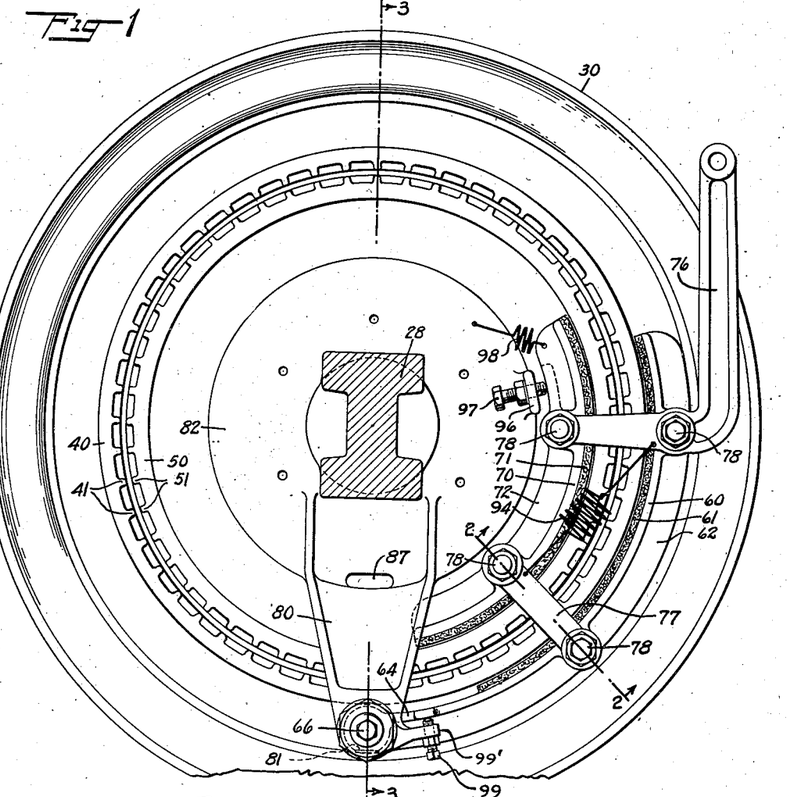
Fig. 1 is a side elevation of a dual wheeled structure embodying the brake of the present invention, looking from the center of the vehicle, the axle being shown in section and certain parts being broken away for the sake of clarity.
Figure 2:
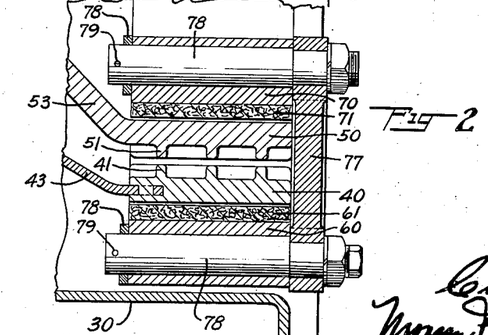
Fig. 2 is a sectional view taken on the line 2—2 of Fig. 1.
Figures 3, 4, 5:
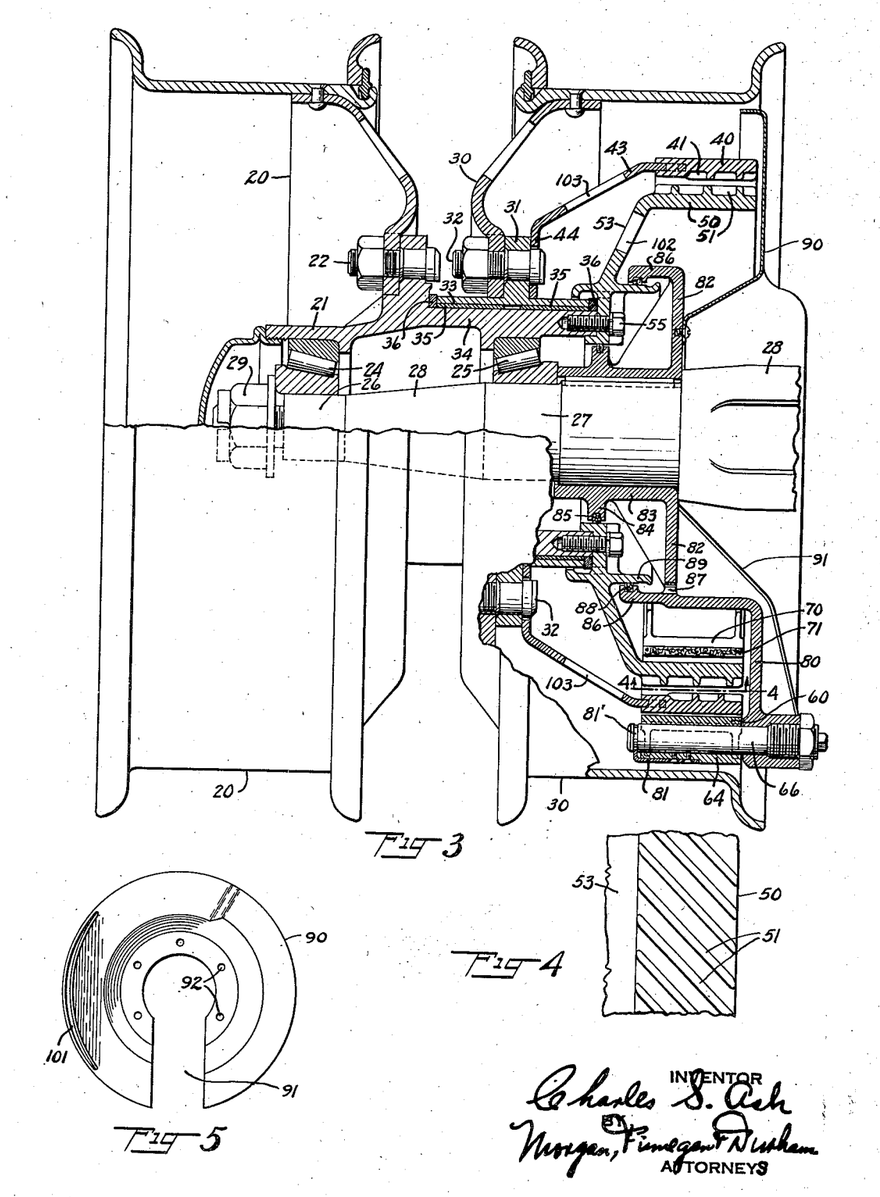
Fig. 3 is a vertical sectional view taken on the line 3—3 of Fig. 1.
Fig. 4 is a sectional view taken on the line 4—4 of Fig. 3.
Fig. 5 is a side elevation of the brake cover plate used in connection with the embodiment of Figs. 1 to 4.
Figure 6:
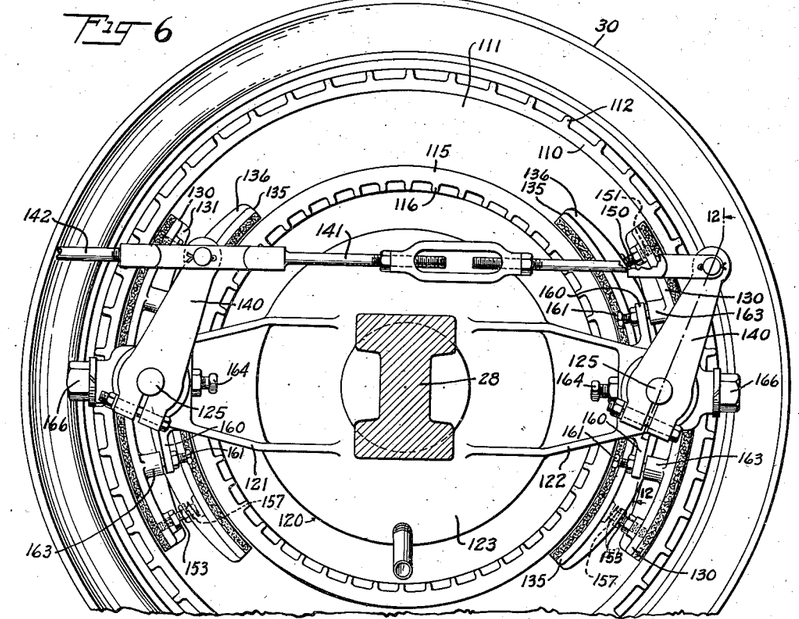
Fig. 6 is a similar side elevation of a modified embodiment of the present invention, certain parts being broken away and the axle being shown in section, the brake being adapted for mechanical operation.
Figure 7:
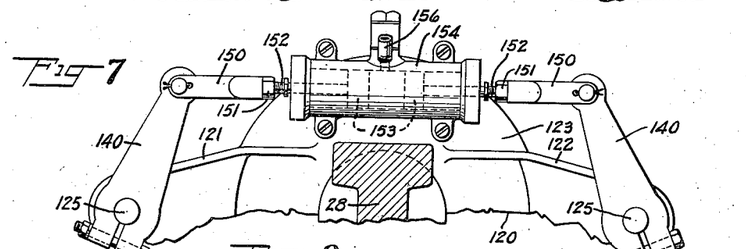
Fig. 7 is a fragmentary detailed view of the hydraulic brake operating mechanism suitable for use in connection with the modified embodiment of Fig. 6.
Figure 8:
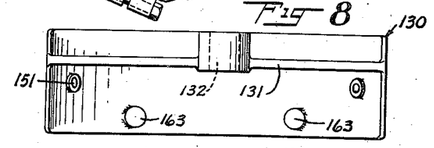
Fig. 8 is an elevation of the brake shoe used in connection with the embodiment of Figs. 6 and 7, this brake shoe being the outer brake shoe for the inner wheel.
Figure 9:
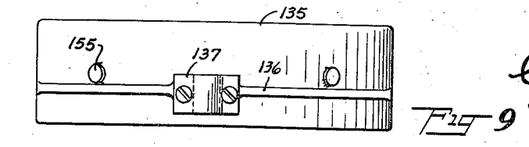
Fig. 9 is a similar view of the inner brake shoe for the outer wheel.
Figure 10:
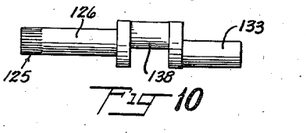
Fig. 10 is a detailed side elevation of the brake operating means used in connection with the embodiment of Figs. 6 to 9.
Figures 11, 12, 13:
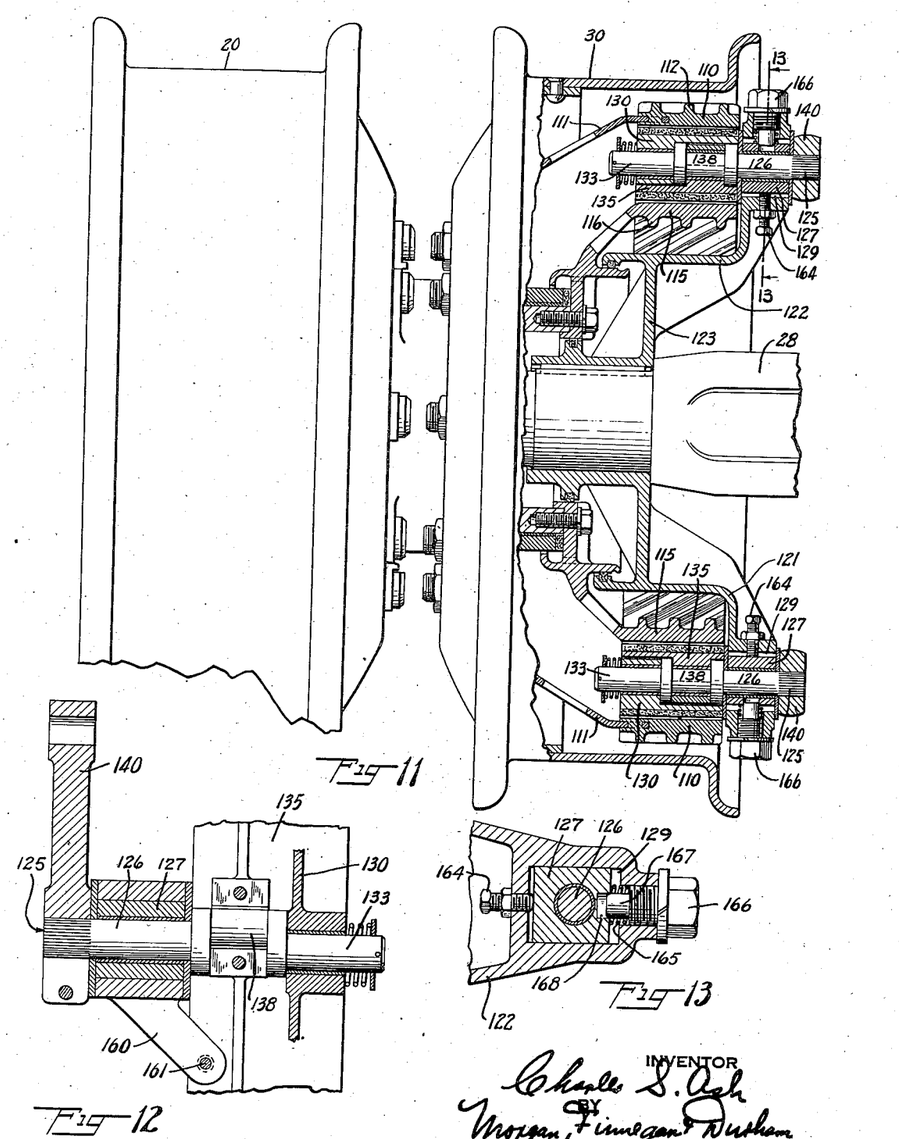
Fig. 11 is a plan view of the brake and wheel structure shown in Figs. 1 to 10, the brake mechanism and parts of the inner wheel being shown in central section.
Fig. 12 is a sectional view taken on the line 12—12 of Fig. 6.
Fig. 13 is a sectional view taken on the line 13—13 of Fig. 11.

Figure 7 shows a modification of the braking system of Figures 6 to 13 and as shown in Figure 7 the brakes are adapted to be hydraulically actuated. In this form, the brake operating lever arms 140 are shifted with respect to the crank pins 125 so that in the position shown in Figure 7 both pairs of brake shoes are fully retracted. The upper ends of levers 140 are connected by means of links 150 the length of which can be minutely varied and set by means of locking nut 151, these links being carried by the ends of piston rods 152 connected to the two pistons 153 operating within the hydraulic cylinder 154, which is mounted on a brake anchor plate 123 and receives the hydraulic fluid under relatively high pressure to pipe 156 when the brakes are to be operated. As the fluid is supplied to brake operating cylinder 154, the pistons 153 are forced apart, thereby moving the lever arms 140 in opposite directions so as to expand the brake shoes into contact with their respective brake drums.

Figures 14, 15:
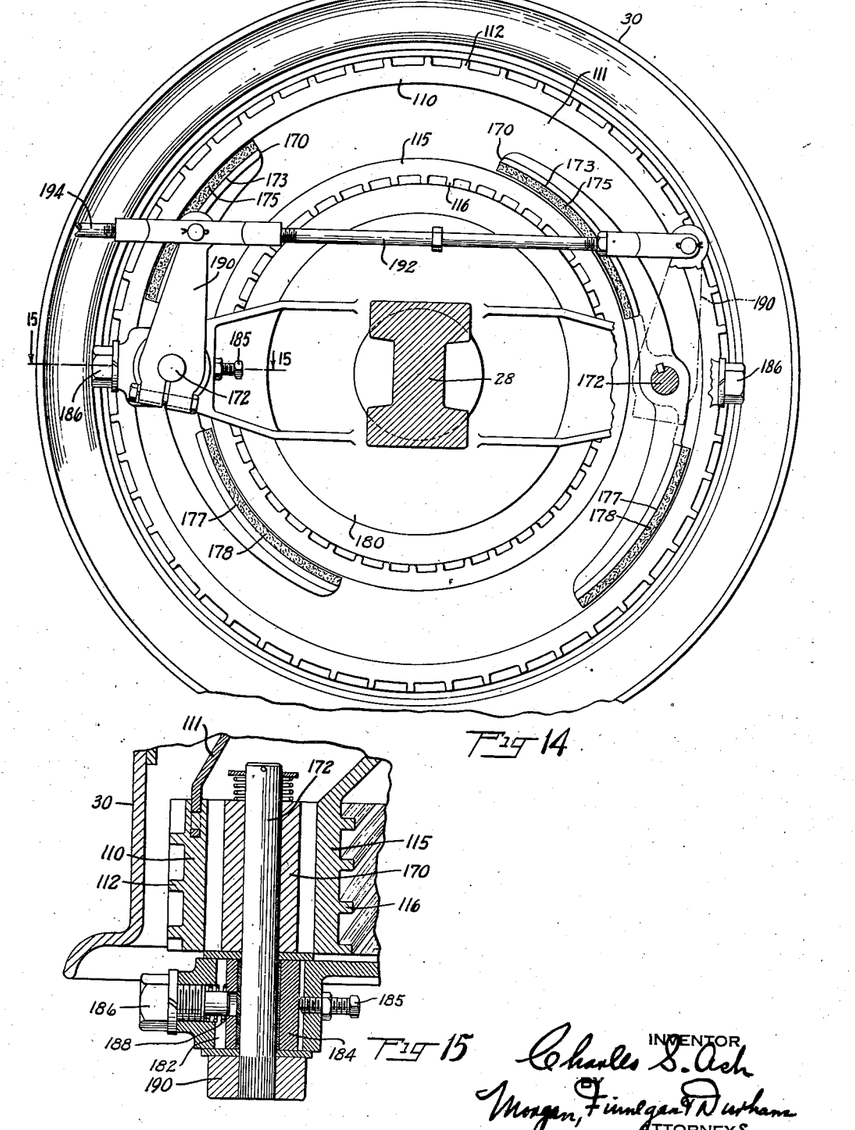
Fig. 14 is an inner side elevation of a further modification of the present invention, the brake cover plate and a portion of the brake supporting structure being removed for clarity.
Fig. 15 is a horizontal, detailed fragmentary sectional view taken on the line 15—15 of Fig. 14.
Figure 16:
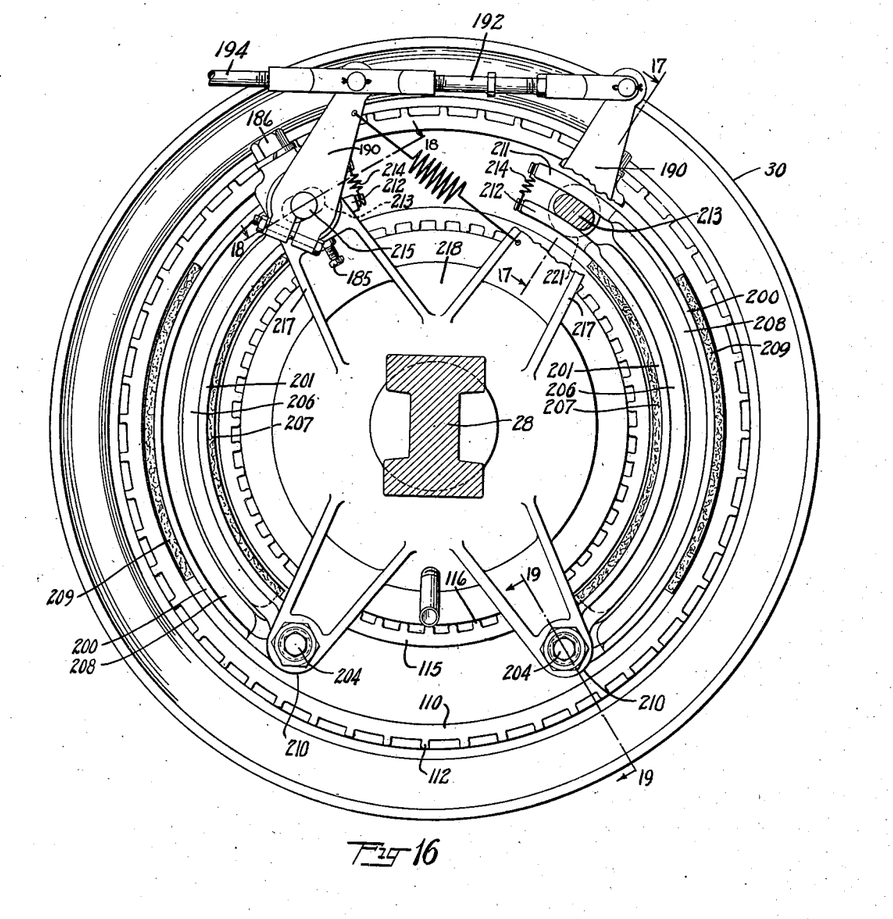
Fig. 16 is a similar side elevation of a modification of the present invention in which a plurality of braking shoes are provided for each of the wheels.
Figures 17, 18:
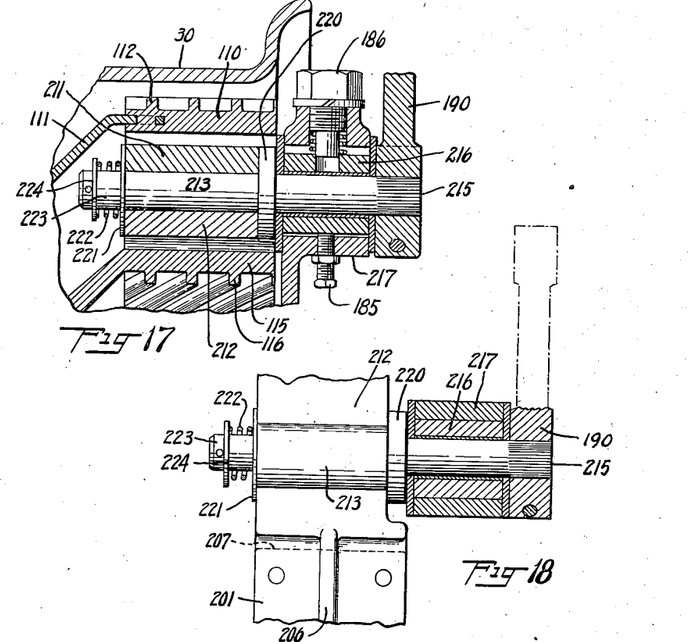
Figs. 17, 18 and 19 are fragmentary sectional views taken on the lines 17—17, 18—18 and 19—19, respectively, of Fig. 16.

Figures 14 and 15 illustrate a modification of the invention in which the brake shoes are mounted for pivotal movement towards and from the concentric brake drums and are illustratively positioned between the inner and outer brake drums which are connected with the outer and inner wheels respectively. As shown, the wheel and brake drum assemblies are identical with those of Figure 6 and provide an annular space between them in which the pairs of brake shoes are mounted. Each pair of brake shoes comprises an arcuate web supporting member 170 provided with an aperture near its intermediate point by which it may be keyed to the brake operating stud 172. The web member 170 is widened out on one side of the stud to provide a concave parti-cylindrical surface 173 on which the outer wheel brake lining 175 is firmly seated, while on the other side of stud 172 the web member is widened out to provide a convex parti-cylindrical surface 177 on which the inner wheel brake lining 178 is also firmly seated. The area of these brake linings 175 and 178 is preferably equal so as to equally distribute the wear and provide equal braking effort on both wheels.

Two such pairs of brake shoes are provided for each pair of independently rotatable dual wheels, and the brake shoes are preferably mounted on opposite sides of the vehicle axle with their operating studs 172 in approximate diametrically opposed relation. For supporting the brake shoes, a brake supporting casting 180 is mounted on the axle end and extends forwardly and rearwardly of the axle having approximately diametrically opposed arms at the ends of which are provided rectangular openings 182 in which are slidably seated square bearing blocks 184 for the studs 172. A set screw 185 limits the inward movement of the block 182 and thereby correctly positions the brake shoes so that the two shoes of each pair will simultaneously engage their respective brake drums, while the guide screw 186 and compression spring 188 serve to normally hold the block 182 against the set screw, at the same time permitting it to move under the pressure of braking.

Means are provided for simultaneously operating all of the brake shoes, and for this purpose each of the studs 172 is provided with an arm 190 extending upwardly from its stud 172, and these arms are interconnected in parallel relation for equal pivotal movement by means of the adjustable turnbuckle link 192 which is pivotally connected to the upper end of each arm, while the brake shoes are connected to the brake operating pedal or power cylinder by means of the link or cable end 194 which is adjustably threaded into the forward end of the turnbuckle 192.

As the turnbuckle link 192 is moved forwardly (to the left) the arms 190 are rotated counter-clockwise similarly moving the brake shoes 173 and 177 and pressing them into contact with their respective brake drums with a pressure determined by the force applied through cable or link 194.

Figures 16 to 19 illustrate a further modification of the braking means of the present invention, and as there shown there are provided pairs of expansible brake shoes positioned in the annular space between the inner and outer brake drums, the brake shoes being pivotally interconnected in pairs at one end and other means being provided for expansively moving the brake shoes about their pivots and into braking contact with the inner surface of the outer brake drum and the outer surface of the inner drum.

Figure 19:
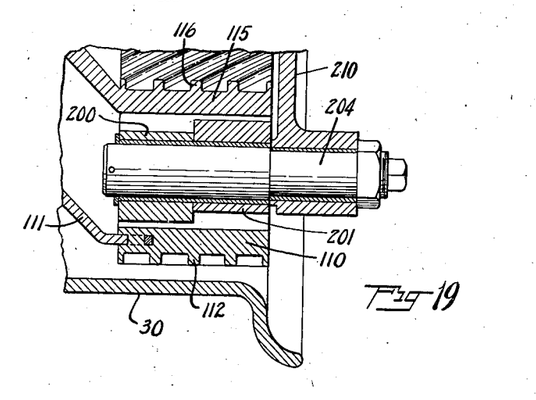

In these figures, the wheel assembly and brake drums are illustratively shown as duplicates of those in Figure 14. The brake shoes 200 for the outer brake drum 110 and the brake shoes 201 for the inner brake drum 115 are arcuate and are pivotally mounted on a mounting stud 204 as shown in Figure 19. Brake shoe 201 is provided with a strengthening web 206 which is integral with the concave parti-cylindrical surface portion of the shoe to which concave surface the brake lining 207 is firmly attached. The outer brake shoe 200 is similarly provided with a strengthening rib 208 inwardly of the portion which is formed with a convex parti-cylindrical surface to which the outer brake lining 209 is attached.

Brake shoes 200 and 201 fit closely together and when in retracted position substantially fill the space between the inner and outer brake drums 110 and 115 so that only small amount of movement is needed to press them into engagement with their respective brake drums. At their lower ends, the brake shoes 200 and 201 are slightly offset so that they may both be pivoted on the same mounting stud 204 which projects towards the wheels from the two lower arms 210 of the four-armed spider 218 which may be a casting supported on the end of the axle and held against rotation.

For supporting the upper ends of the brake shoes and for expanding the brake shoes into braking contact with their respective brake drums, the upper ends of the brake shoes 200 and 201 are provided with extensions 211, 212 which lie against and are adapted to be spread apart by a cam 213 formed on the end of a stub shaft 215. A tension spring 214 is attached to the ends of the extensions 211, 212 and serves to maintain the latter in contact with cam 213. Stub shaft 215 is journaled in the bearing block 216 which is slidable radially in a rectangular slot formed in the upper arms 217 of the spider 218. The brake shoes 200, 201 may be held in axial alignment on the cam 213 by their arrangement between a collar 220, formed on stub shaft 215, and a washer 221, resiliently urged towards the sides of the extensions 211, 212 by a spring 222 which is held in place on the end 223 of stub shaft 215 by a pin and washer 224.

The inner ends of stub shafts 215 are shown as provided with brake operating arms 190, interconnecting links and operating mechanism similar to that shown and described in detail in connection with Figure 14.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheeled structure including in combination a pair of independently rotatable wheels mounted side by side in coaxial relation, a brake drum fast to each wheel, the brake drums being coaxial and one substantially enclosing the other, and brake shoes movable relatively to each other and the drums to engage the inner surface of one brake drum and the outer surface of the other.

2. A dual wheeled structure including in combination a pair of independently rotatable wheels mounted side by side for coaxial rotation, a brake drum connected with each wheel, the brake drums being coaxial and overlapping each other axially, a plurality of brake shoes positioned between the brake drums and engageable with both drums, a rotatable member on which the brake shoes are eccentrically mounted and means for rotating the rotatable member to move the brake shoes into contact with both drums.

3. A dual wheeled structure including in combination a pair of independently rotatable wheels mounted side by side in coaxial relation, a brake drum fast to each wheel, the brake drums being coaxial and one substantially enclosing the other, and brake shoes movable relatively to each other and the drums engageable with both brake drums and positioned betwen the brake drums.

4. A dual wheeled structure including in combination a pair of independently rotatable wheels mounted side by side for coaxial rotation, a brake drum connected with each wheel, the brake drums being coaxial and overlapping each other axially, a plurality of brake shoes diametrically opposed and engageable with both brake drums and means for moving the brake shoes relatively towards and away from each other into and out of engagement with both brake drums.

5. A dual wheeled structure including in combination a pair of independently rotatable wheels mounted side by side in coaxial relation, a brake drum fast to each wheel, the brake drums being coaxial and one substantially enclosing the other, and brake shoes movable relatively to each other and the drums engageable with both brake drums and spaced apart to receive both brake drums between them.

6. A dual wheeled structure including in combination a pair of independently rotatable wheels mounted side by side for coaxial rotation, a brake drum connected with each wheel, the brake drums being coaxial and overlapping each other axially, a plurality of pairs of brake shoes diametrically opposed to each other, the shoes of each pair being engageable with both brake drums and means for relatively moving the brake shoes to engage all of the shoes with the brake drums.

7. A dual wheeled structure including in combination a pair of independently rotatable wheels mounted side by side in coaxial relation, a brake drum fast to each wheel, the brake drums being coaxial and one substantially enclosing the other, brake shoes movable into engagement with both brake drums and cooling fins on adjacent sides of both brake drums extending from one edge of each drum to the other edge for drawing cooling air between the brake drums.

8. A dual wheeled structure including in combination a pair of independently rotatable wheels mounted side by side for coaxial rotation, a brake drum connected with each wheel, the brake drums being coaxial and overlapping each other axially, a plurality of pairs of brake shoes diametrically opposed to each other, the shoes of each pair being engageable with both brake drums, angularly displaced eccentrics on which the brake shoes are mounted and means for rotating the eccentrics to engage the brake shoes with their brake drums.

9. A dual wheeled structure including in combination a pair of independently rotatable wheels mounted side by side in coaxial relation, a brake drum fast to each wheel, the brake drums being coaxial and one substantially enclosing the other, brake shoes movable into engagement with both brake drums and cooling fins on the opposite sides of both brake drums to draw air over the brake drums.

10. A dual wheeled structure including in combination a pair of independently rotatable wheels mounted side by side for coaxial rotation, a brake drum connected with each wheel, the brake drums being coaxial and overlapping each other axially, a plurality of pairs of brake shoes diametrically opposed to each other, a plurality of pivots on which the brake shoes are mounted, the shoes of each pair being on opposite sides of the corresponding pivot and means for moving the brake shoes about their pivots to engage the brake shoes with their brake drums.

11. A dual wheeled structure including in combination a pair of independently rotatable wheels mounted side by side in coaxial relation, a brake drum fast to each wheel, the brake drums being coaxial and one substantially enclosing the other, a brake shoe engageable with the adjacent faces of both brake drums and a pivot intermediate the ends of the brake shoe whereby the brake shoe may be moved into and out of contact with both brake drums.

12. A dual wheeled structure including in combination a pair of independently rotatable wheels mounted side by side for coaxial rotation, a brake drum connected with each wheel, the brake drums being coaxial and overlapping each other axially, a pair of brake shoes engageable with the brake drums, a double eccentric at one end of the brake shoes for relative movement of the brake shoes, means for locking the eccentric to hold the pair of brake shoes in the desired spacing, a double eccentric on which the other end of the brake shoe pair is mounted and means for rotating the second eccentric to move the brake shoes radially for engagement with both brake drums.

13. A dual wheeled structure including in combination a pair of independently rotatable wheels mounted side by side in coaxial relation, a brake drum fast to each wheel, the brake drums being coaxial and one substantially enclosing the other, a plurality of brake shoes interconnected by links radial with respect to said drums and means for moving the links from their radial position to move the shoes relatively to each other and into engagement with both drums.

14. A dual wheeled structure including in combination a pair of independently rotatable wheels mounted side by side for coaxial rotation, a brake drum connected with each wheel, the brake drums being coaxial and overlapping each other axially, a pair of arcuate brake shoes mounted concentrically with each other and with the brake drums, and means normally spacing the brake shoes apart and angularly movable to move the brake shoes relatively to each other and into engagement with both brake drums.

15. A dual wheeled structure including in combination a pair of independently rotatable wheels mounted side by side for coaxial rotation, a brake drum connected with each wheel, the brake drums being coaxial and overlapping each other axially, a pair of arcuate brake shoes mounted concentrically with respect to each other and to the brake drums, links extending radially with respect to said drums interconnecting the brake shoes and means for moving the links to force the brake shoes into engagement with their respective brake drums.

16. A dual wheeled structure including in combination a pair of independently rotatable wheels mounted side by side for coaxial rotation, a brake element connected with each wheel, the brake drums being coaxial, a pair of relatively movable brake shoes movable relatively to each other and the drums, one to engage each brake drum.

17. A dual wheeled structure including in combination a pair of independently rotatable wheels mounted side by side for coaxial rotation, a brake element connected with each wheel, said brake drums being coaxial, and a pair of relatively movable brake shoes movable relatively to each other and the drums positioned between the brake drums and movable into engagement with both brake drums.

CHARLES S. ASH.